United States Patent
Murasaka

(10) Patent No.: US 11,933,200 B2
(45) Date of Patent: Mar. 19, 2024

(54) VALVE TIMING CHANGE DEVICE

(71) Applicant: MIKUNI CORPORATION, Tokyo (JP)

(72) Inventor: Riki Murasaka, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 57 days.

(21) Appl. No.: 17/605,146

(22) PCT Filed: Jul. 9, 2019

(86) PCT No.: PCT/JP2019/027110
§ 371 (c)(1),
(2) Date: May 4, 2022

(87) PCT Pub. No.: WO2021/005704
PCT Pub. Date: Jan. 14, 2021

(65) Prior Publication Data
US 2022/0307390 A1    Sep. 29, 2022

(51) Int. Cl.
*F01L 1/344* (2006.01)

(52) U.S. Cl.
CPC .................. *F01L 1/3442* (2013.01)

(58) Field of Classification Search
CPC ......... F01L 1/3442; F01L 1/344; F01L 1/053; F01L 2001/34469; F01L 2001/34483
(Continued)

(56) References Cited

U.S. PATENT DOCUMENTS

| | | | |
|---|---|---|---|
| 2005/0252468 A1 | 11/2005 | Tanaka | |
| 2011/0073055 A1* | 3/2011 | Kobayashi | F01L 1/3442 123/90.17 |

(Continued)

FOREIGN PATENT DOCUMENTS

| | | |
|---|---|---|
| CN | 102032009 A | 4/2011 |
| JP | 2005325758 A | 11/2005 |

(Continued)

OTHER PUBLICATIONS

International Preliminary Report on Patentability issued in Intl. Appln. No. PCT/JP2019/027110 dated Jan. 20, 2022. English translation provided.
English translation of Written Opinion issued in Intl. Appln. No. PCT/JP2019/027110 dated Oct. 1, 2019, previously cited in IDS filed Oct. 20, 2021.
International Search Report issued in Intl. Apln. No. PCT/JP2019/027110 dated Oct. 1, 2019. English translation provided.
(Continued)

*Primary Examiner* — Kenneth J Hansen
*Assistant Examiner* — Kelsey L Stanek
(74) *Attorney, Agent, or Firm* — ROSSI, KIMMS & McDOWELL LLP

(57) ABSTRACT

A valve timing change device 2 comprises: a vane rotor 4; a housing 6 accommodating the vane rotor; a spring 8 contacting at one end portion 8b the housing and contacting at another end portion 8c the vane rotor to bias the vane rotor against the housing in a circumferential direction of the vane rotor; a first protruding portion 32 protruding from an end surface 6a of the housing on a first direction side of an axial direction of the vane rotor and contacting the one end portion of the spring so as to be biased by the spring; and a retaining portion 34 disposed on the first direction side of the one end portion of the spring and extending from the first protruding portion so as to restrict movement of the one end portion of the spring in the first direction. The first protruding portion and the retaining portion are formed integrally with the housing.

8 Claims, 6 Drawing Sheets

(58) Field of Classification Search
USPC .................................................... 123/90.15
See application file for complete search history.

(56) References Cited

U.S. PATENT DOCUMENTS

| | | | |
|---|---|---|---|
| 2013/0276733 A1 | 10/2013 | Janitschek | |
| 2014/0069361 A1* | 3/2014 | Watanabe | F01L 1/3442 123/90.15 |
| 2015/0361837 A1 | 12/2015 | Sugano | |
| 2017/0248046 A1* | 8/2017 | Hopkins | F01L 1/3442 |
| 2022/0220869 A1* | 7/2022 | Chikayama | F01L 1/356 |

FOREIGN PATENT DOCUMENTS

| | | | |
|---|---|---|---|
| JP | 2011069287 A | 4/2011 | |
| JP | 2014051925 A | 3/2014 | |
| JP | 2014137051 A | 7/2014 | |

OTHER PUBLICATIONS

Written Opinion issued in Intl. Apln. No. PCT/JP2019/027110 dated Oct. 1, 2019.
Office Action issued in Chinese Appln. No. 201980096012.X dated Aug. 4, 2023.

* cited by examiner

VALVE TIMING CHANGE DEVICE

TECHNICAL FIELD

The present disclosure relates to a valve timing change device.

BACKGROUND

Conventionally, a valve timing change device may be used to change the valve timing (opening and closing timing of intake valve or exhaust valve) of a reciprocating engine in order to achieve efficient intake or exhaust in the reciprocating engine.

Patent Document 1 discloses a valve timing change device including a vane rotor, a housing accommodating the vane rotor, and a spring configured to bias the vane rotor against the housing in the circumferential direction of the vane rotor.

In the valve timing change device described in Patent Document 1, a pin is press-fitted and fixed to one end surface of the housing in the axial direction of the vane rotor, and the housing receives a biasing force from the spring via the pin. Further, a retaining portion is disposed on the tip side of the pin to prevent the spring from falling out.

CITATION LIST

Patent Literature

Patent Document 1: JP2005-325758A

SUMMARY

Problems to be Solved

In the valve timing change device described in Patent Document 1, since the housing and the pin with the retaining portion are configured as separate parts, the number of parts in the valve timing change device is large, which leads to a complicated configuration and an increase in cost of the valve timing change device.

In view of the above, an object of at least one embodiment of the present invention is to provide a valve timing change device that can suppress the spring from falling out with a small number of parts.

Solution to the Problems (1) A valve timing change device according to at least one embodiment of the present invention for changing a valve timing of a reciprocating engine comprises: a vane rotor; a housing accommodating the vane rotor; a spring contacting at one end portion the housing and contacting at another end portion the vane rotor to bias the vane rotor against the housing in a circumferential direction of the vane rotor; a first protruding portion protruding from an end surface of the housing on a first direction side of an axial direction of the vane rotor and contacting the one end portion of the spring so as to be biased by the spring; and a retaining portion disposed on the first direction side of the one end portion of the spring and extending from the first protruding portion so as to restrict movement of the one end portion of the spring in the first direction. The first protruding portion and the retaining portion are formed integrally with the housing.

(2) In some embodiments, the valve timing change device described in the above (1) may further comprise: a power transmission member disposed on the opposite side of the vane rotor from the spring and configured to transmit power; and a first fastening member inserted in a first fastening hole passing through the power transmission member in the axial direction and a second fastening hole passing through the housing in the axial direction to fasten the power transmission member to the housing. The retaining portion may be disposed in an existence range of the second fastening hole in a view from the axial direction.

(3) In some embodiments, in the valve timing change device described in the above (1) or (2), the housing may include an outer peripheral protruding portion extending along the circumferential direction on an outer peripheral side of the spring so as to protrude from the end surface in the first direction, and the first protruding portion may connect the outer peripheral protruding portion to the retaining portion.

(4) In some embodiments, in the valve timing change device described in the above (3), the outer peripheral protruding portion may be formed integrally with the first protruding portion, the retaining portion, and the housing.

(5) In some embodiments, in the valve timing change device described in any one of the above (1) to (4), $B > A$ may be satisfied, where A is a maximum value of a distance between a side surface of the first protruding portion and an outer peripheral surface of the housing, and B is a dimension of the first protruding portion in the circumferential direction.

(6) In some embodiments, in the valve timing change device described in any one of the above (1) to (5), $C \geq D/2$ may be satisfied, where C is a width of overlap of the retaining portion and the spring in a thickness direction of the spring in a view from the axial direction, and D is a thickness of the spring.

Advantageous Effects

At least one embodiment of the present invention provides a valve timing change device that can suppress the spring falling out with a small number of parts.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
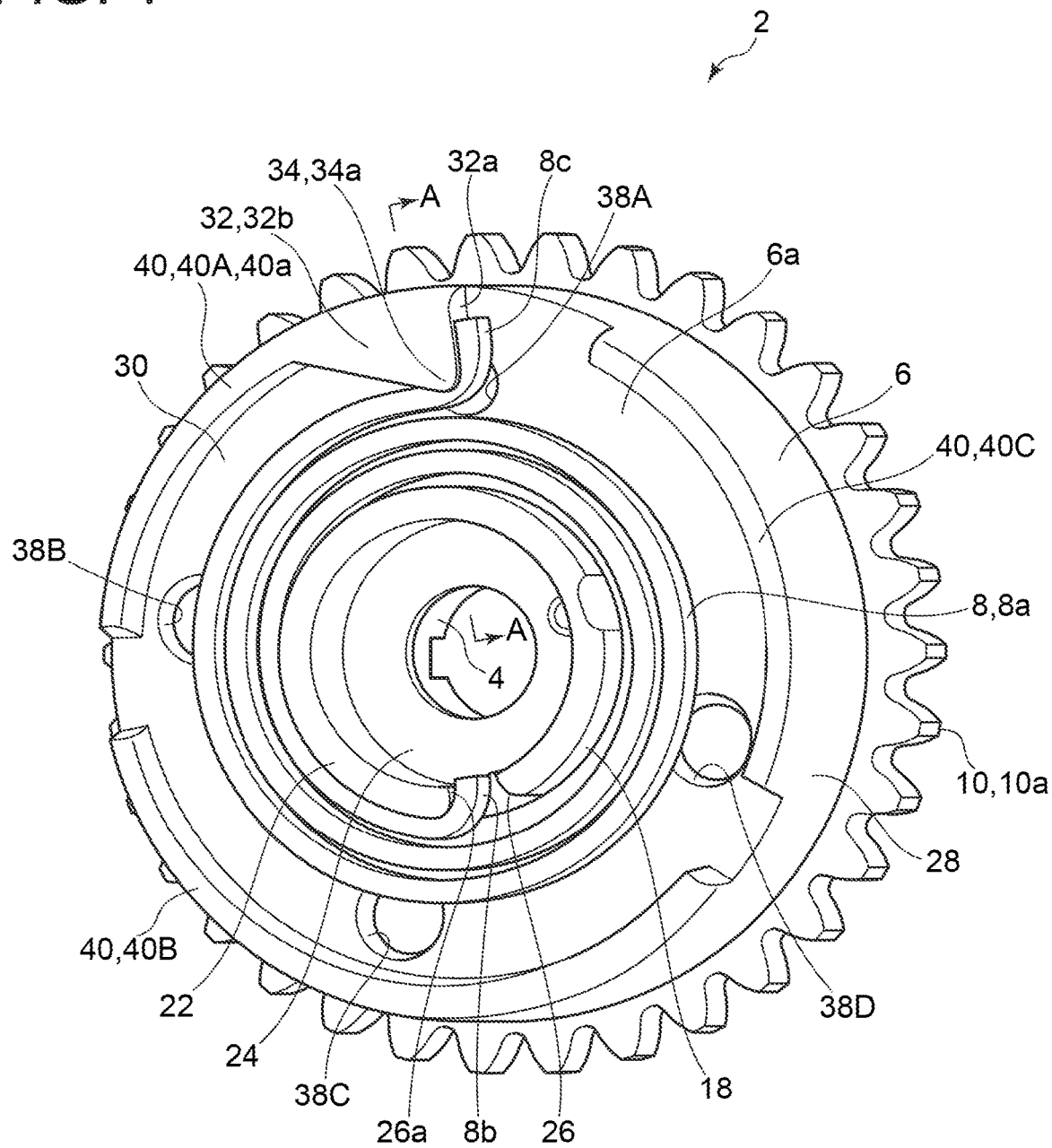
FIG. 1 is a schematic perspective view of a valve timing change device according to an embodiment of the present invention.
Figure 2:
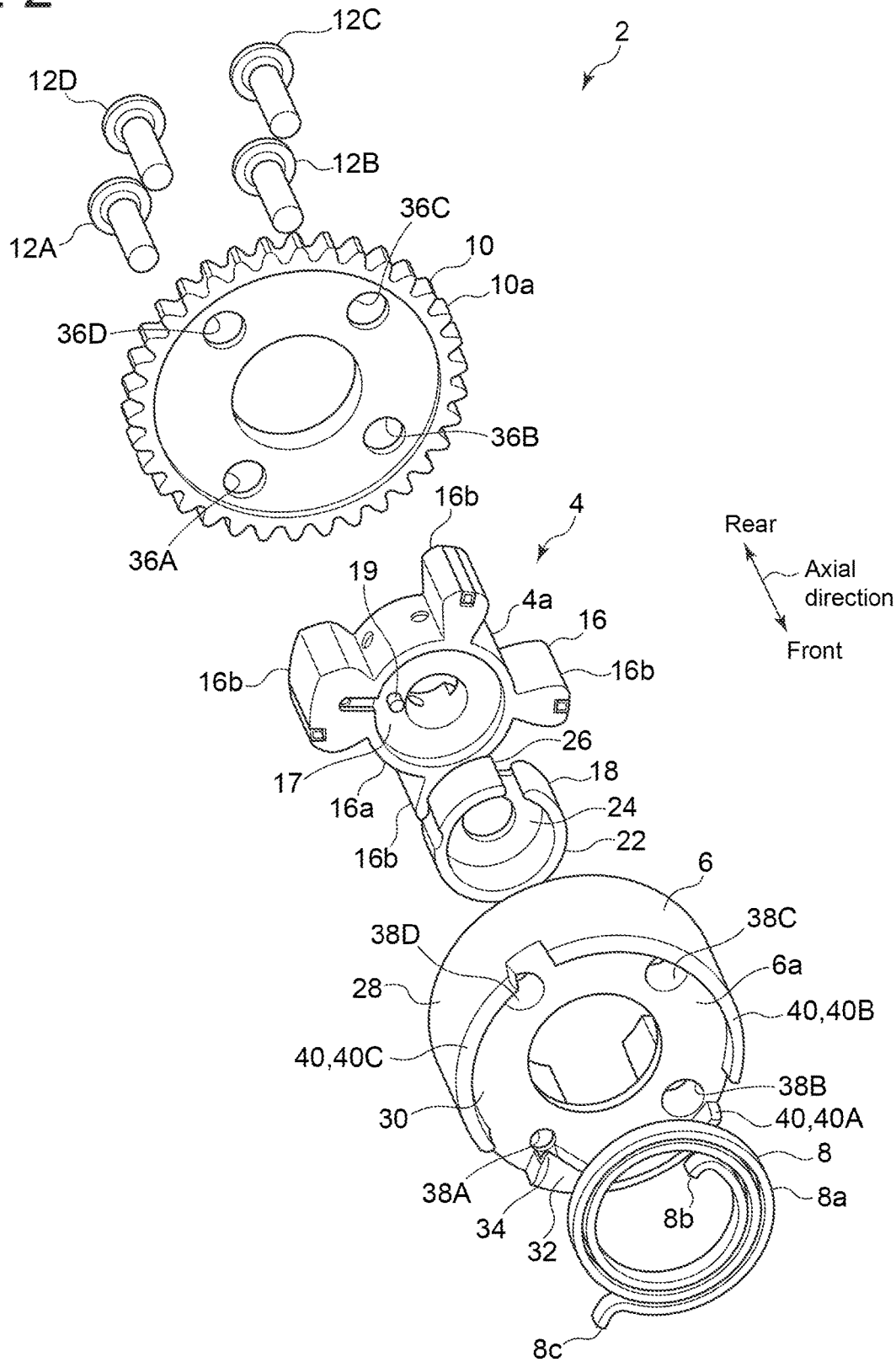
FIG. 2 is an exploded perspective view of the valve timing change device shown in FIG. 1.
Figure 3:
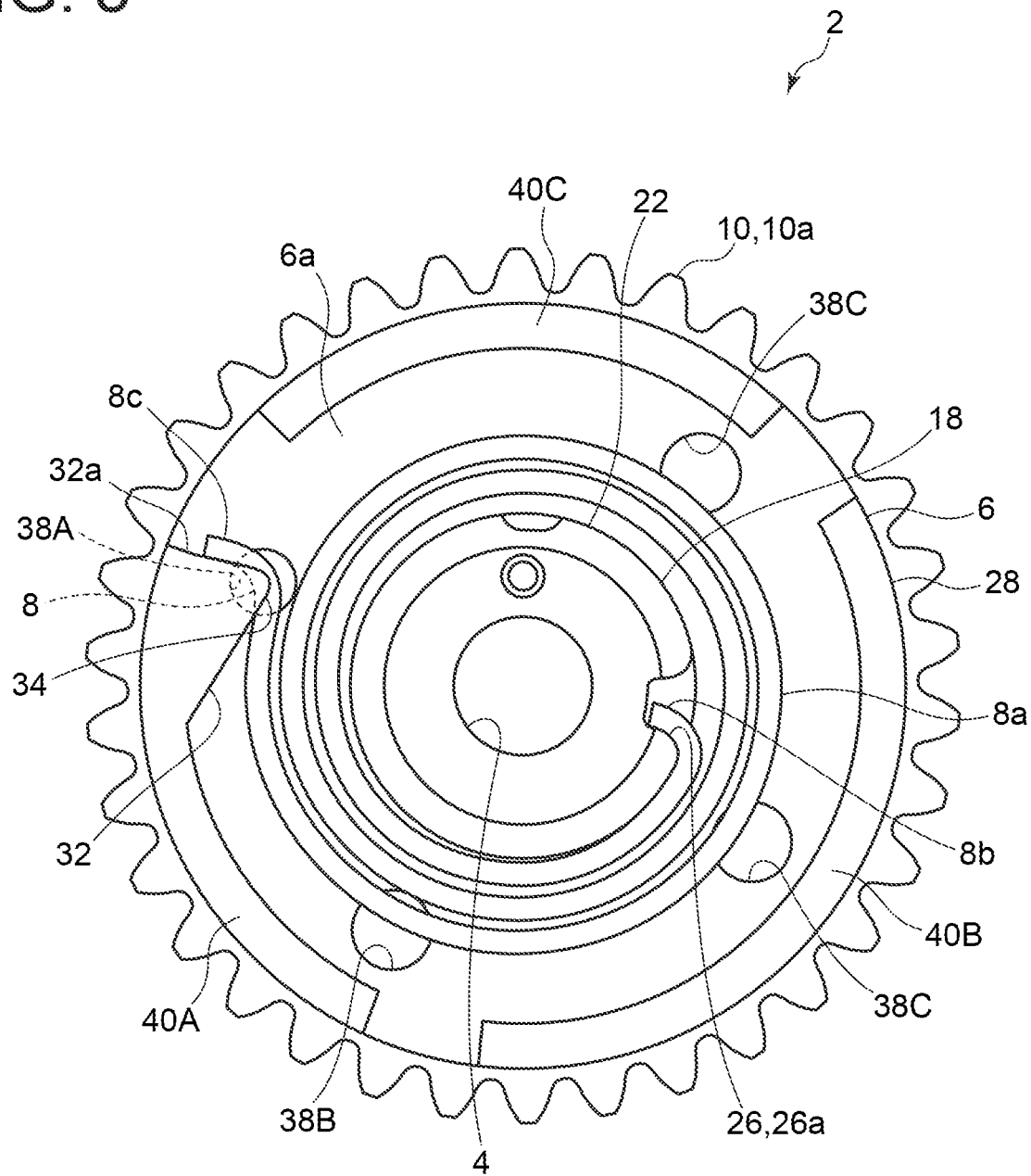
FIG. 3 is a front view of the valve timing change device shown in FIG. 1.
Figure 4:
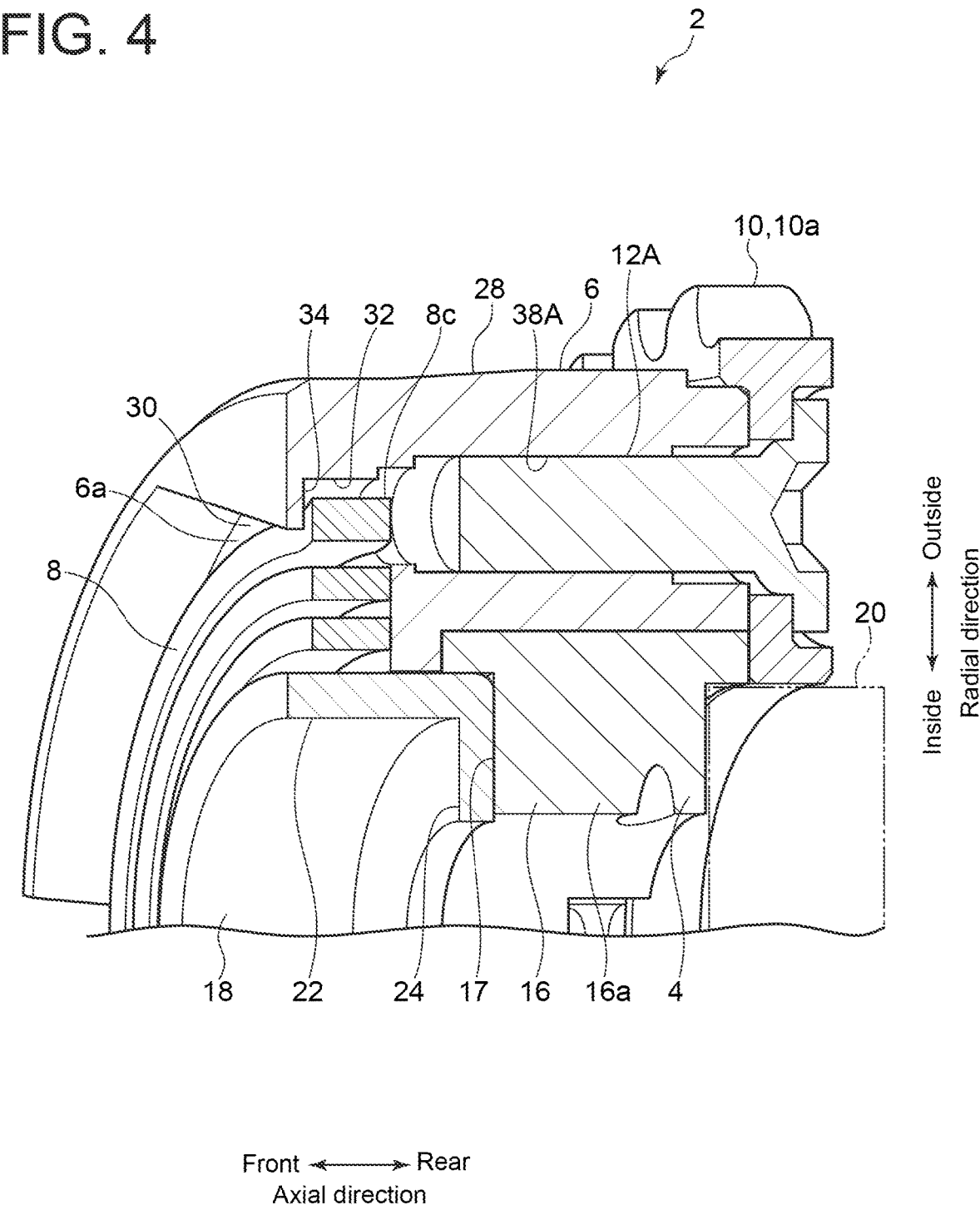
FIG. 4 is a cross-sectional view of the valve timing change device shown in FIG. 1, taken along line A-A.

FIG. 1 is a schematic perspective view of a valve timing change device 2 according to an embodiment of the present invention. FIG. 2 is an exploded perspective view of the valve timing change device 2 shown in FIG. 1. FIG. 3 is a front view of the valve timing change device 2 shown in FIG. 1. FIG. 4 is a cross-sectional view of the valve timing change device 2 shown in FIG. 1, taken along line A-A.

The valve timing change device 2 is a phase-shift type variable valve mechanism that changes the valve timing of a reciprocating engine (not shown) (opening and closing timing of intake or exhaust valves of a reciprocating engine) by advancing or retarding a camshaft relative to a crankshaft (not shown). The valve timing change device 2 is connected to a camshaft 20 (see FIG. 4) that drives the intake valve or the exhaust valve and is configured to rotate on the same axis as the camshaft 20. The valve timing change device 2 may be for motorcycles, for example, or for other automobiles.

For example, as shown in FIG. 2, the valve timing change device 2 includes a vane rotor 4, a housing 6, a spring 8, a sprocket 10 (power transmission member), and a plurality of screws 12 (12A to 12D).

Hereinafter, the axial direction of the vane rotor 4 is referred to as merely "axial direction", and the radial direction of the vane rotor 4 is referred to as merely "radial direction", and the circumferential direction of the vane rotor 4 is referred to as merely "circumferential direction". Further, the first direction in the axial direction from the vane rotor 4 to the housing 6 (from the sprocket 10 to the vane rotor 4 and the housing 6) is referred to as "forward direction" or merely "front", and the second direction in the axial direction from the housing 6 to the vane rotor 4 (from the housing 6 to the vane rotor 4 and the sprocket 10) is referred to as "rearward direction" or merely "rear".

For example, as shown in FIG. 2, the vane rotor 4 includes a vane rotor body 16 and a cylindrical member 18. The vane rotor body 16 includes a cylindrical portion 16a and a plurality of vane portions 16b disposed on the outer peripheral side of the cylindrical portion 16a at intervals in the circumferential direction. As shown in FIG. 4, the vane rotor body 16 is connected to the camshaft 20 that drives the intake valve or the exhaust valve via a bolt (not shown) and is configured to rotate on the same axis as the camshaft 20.

For example, as shown in FIG. 2, the cylindrical member 18 includes a cylindrical portion 22 and an annular plate portion 24 disposed at the rear end of the cylindrical portion 22 along a plane intersecting the axial direction so as to face a front surface 17 of the cylindrical portion 16a of the vane rotor body 16. The cylindrical member 18 is positioned with a pin 19 on the front surface 17 of the cylindrical portion 16a and rotates in conjunction with the vane rotor body 16 and the camshaft 20 (see FIG. 4). The cylindrical portion 22 has a slit 26 formed along the axial direction and passing through the cylindrical portion 22 in the radial direction.

For example, as shown in FIG. 2, the plurality of screws 12 fasten the sprocket 10 to the housing 6. In the illustrated exemplary embodiment, the plurality of screws 12 include four screws 12 (12A to 12D). The sprocket 10 has a plurality of axially through holes 36 (36A to 36D) formed at intervals in the circumferential direction, and a front cover portion 30 of the housing 6 has a plurality of axially through fastening holes 38 (38A to 38D) formed at intervals in the circumferential direction. The inner peripheral surface of each of the fastening holes 38 is female threaded. Each of the screws 12 is screwed into the corresponding through hole 36 and fastening hole 38 to fasten the sprocket 10 to the housing 6. Specifically, the screw 12A as a fastening member is screwed into the through hole 36A and the fastening hole 38A, the screw 12B is screwed into the through hole 36B and the fastening hole 38B, the screw 12C is screwed into the through hole 36C and the fastening hole 38C, and the screw 12D is screwed into the through hole 36D and the fastening hole 38D.

For example, as shown in FIGS. 1 and 4, the housing 6 accommodates the vane rotor 4 and includes a cylindrical portion 28 circumferentially enclosing the vane rotor 4 and an annular front cover portion 30 arranged along a plane perpendicular to the axial direction to cover the front side of the plurality of vane portions 16b (see FIG. 2).

A front end surface 6a of the housing 6 in the axial direction (the front end surface of the front cover portion 30) has a first protruding portion 32 that protrudes from the end surface 6a in the forward direction. At the front end of the first protruding portion 32, a retaining portion 34 is formed so as to extend from the first protruding portion 32 inward in the radial direction.

The first protruding portion 32 and the retaining portion 34 are integrally formed from the same material by die casting together with the housing 6. In other words, the cylindrical portion 28, the front cover portion 30, the first protruding portion 32, and the retaining portion 34 are formed as a single component that cannot be separated without damage.

For example, as shown in FIG. 1, the spring 8 is assembled to bias the vane rotor 4 against the housing 6 in the circumferential direction. In the illustrated exemplary embodiment, the spring 8 is composed of a mainspring (spiral spring) and includes a spiral portion 8a (spring portion) of spiral shape. One end portion 8b of the spring 8 extends from the spiral portion 8a in a direction intersecting the circumferential direction, and is caught and held in the slit 26 of the vane rotor 4. In the illustrated embodiment, one end portion 8b of the spring 8 is bent from the inner peripheral portion of the spiral portion 8a and extends inward in the radial direction into the slit 26 along the radial direction, and is in contact with one wall surface 26a of the pair of wall surfaces forming the slit 26. The wall surface 26a of the vane rotor 4 receives a biasing force from one end portion 8b of the spring 8 to one side in the circumferential direction (clockwise direction in an axial view from the front side). In other words, the vane rotor 4 is biased by the spring 8 to one side in the circumferential direction.

The other end portion 8c of the spring 8 extends from the spiral portion 8a in a direction intersecting the circumferential direction, and is caught and held by a side surface 32a of the first protruding portion 32. Thus, the first protruding portion 32 functions as a spring hook to hook the spring 8. In the illustrated embodiment, the other end portion 8c of the spring 8 is bent from the outer peripheral portion of the spiral portion 8a and extends outward in the radial direction along the radial direction, and is in contact with the side surface 32a of the first protruding portion 32. The side surface 32a of the first protruding portion 32 receives a biasing force from the other end portion 8c of the spring 8 to the other side in the circumferential direction (counterclockwise direction in an axial view from the front side). In other words, the first protruding portion 32 is biased by the spring 8 to the other side in the circumferential direction.

In the valve timing change device 2, hydraulic pressure as a driving source rotates the vane rotor 4 relative to the housing 6 in the direction of the biasing force of the spring 8 or in the direction opposite to the biasing force to change the phase of the vane rotor 4 relative to the housing 6. This changes the valve timing of the reciprocating engine by advancing or retarding the camshaft relative to the crankshaft (not shown).

For example, as shown in FIG. 4, the retaining portion 34 is disposed in front of the other end portion 8c of the spring 8 and extends inward in the radial direction from the first protruding portion 32 so as to restrict the movement of the other end portion 8c of the spring 8 in the forward direction. The retaining portion 34 restricts the movement of the other end portion 8c of the spring 8 in the forward direction and thus suppresses the spring 8 from falling out of the housing 6 forward in the axial direction. In the illustrated exemplary embodiment, the retaining portion 34 is formed in a plate shape protruding from the first protruding portion 32 toward the spring 8 along a plane perpendicular to the axial direction. As shown in FIG. 3, the retaining portion 34 at least partially overlaps the spring 8 in the axial view. Further, the retaining portion 34 is disposed in the existence range of the fastening hole 38A in the axial view.

For example, as shown in FIG. 4, the sprocket 10 is disposed on the opposite side of the vane rotor 4 from the spring 8, that is, behind the vane rotor 4. On the outer peripheral surface of the sprocket 10, a gear row 10a is formed. The gear row 10a is wound with a roller chain (not shown) for transmitting power from the crankshaft of the reciprocating engine (not shown), and the power from the crankshaft is transmitted to the sprocket 10 via the gear row 10a. The phase of the vane rotor 4 relative to the phase of the sprocket 10 (the phase of the housing 6) can be fixed by a locking mechanism (not shown) (e.g., locking pin).

For example, as shown in FIGS. 1 and 2, the housing 6 includes at least one outer peripheral protruding portion 40 extending along the circumferential direction on the outer peripheral side of the spring 8 so as to protrude from the end surface 6a of the housing 6 in the forward direction. In the illustrated exemplary embodiment, the housing 6 includes a plurality of outer peripheral protruding portions 40 (40A to 40C) arranged at intervals in the circumferential direction. Each of the outer peripheral protruding portions 40 (40A to 40C) is formed in an arc shape in the axial view, and the thickness of the outer peripheral protruding portion 40 (40A to 40C) in the radial direction is constant at any position in the circumferential direction. The first protruding portion 32 is formed to connect the outer peripheral protruding portion 40A of the plurality of outer peripheral protruding portions 40 (40A to 40C) to the retaining portion 34.

Further, the outer peripheral protruding portions 40 (40A to 40C) are formed integrally with the first protruding portion 32, the retaining portion 34, and the housing 6 from the same material. In other words, the outer peripheral protruding portions 40 (40A to 40C), the cylindrical portion 28, the front cover portion 30, the first protruding portion 32, and the retaining portion 34 are formed as a single component that cannot be separated without damage. Further, the front end surface 34a of the retaining portion 34, the front end surface (top surface) 32b of the first protruding portion 32, and the front end surface (top surface) 40a of the outer peripheral protruding portion 40A are formed on the same plane.

Figure 5:
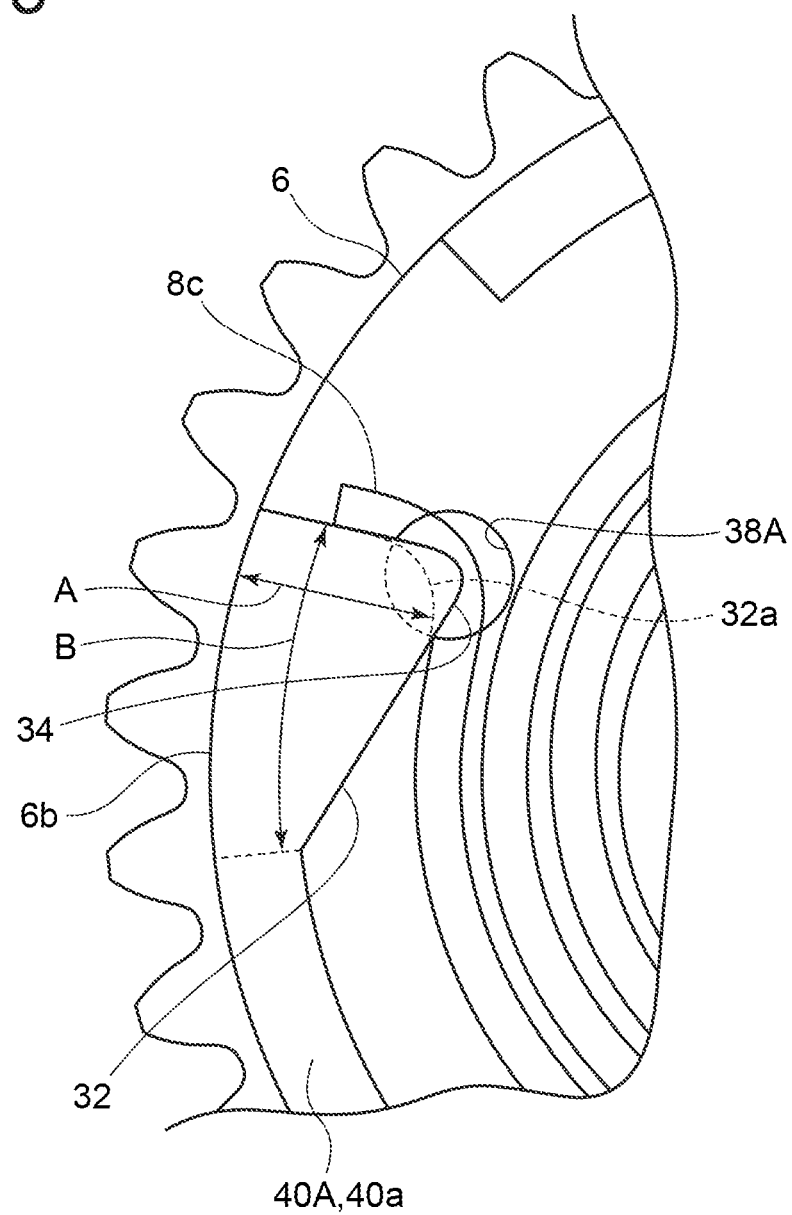
FIG. 5 is a partial enlarged view of the valve timing change device shown in FIG. 3.

FIG. 5 is a partial enlarged view of the valve timing change device 2 shown in FIG. 3.

In the illustrated exemplary embodiment, the first protruding portion 32 is formed to satisfy B>A, where A is a maximum value of the distance between the side surface 32a of the first protruding portion 32 and the outer peripheral surface 6b of the housing 6 (the outer peripheral surface of the cylindrical portion 28), and B is the dimension of the first protruding portion 32 in the circumferential direction.

Figure 6:
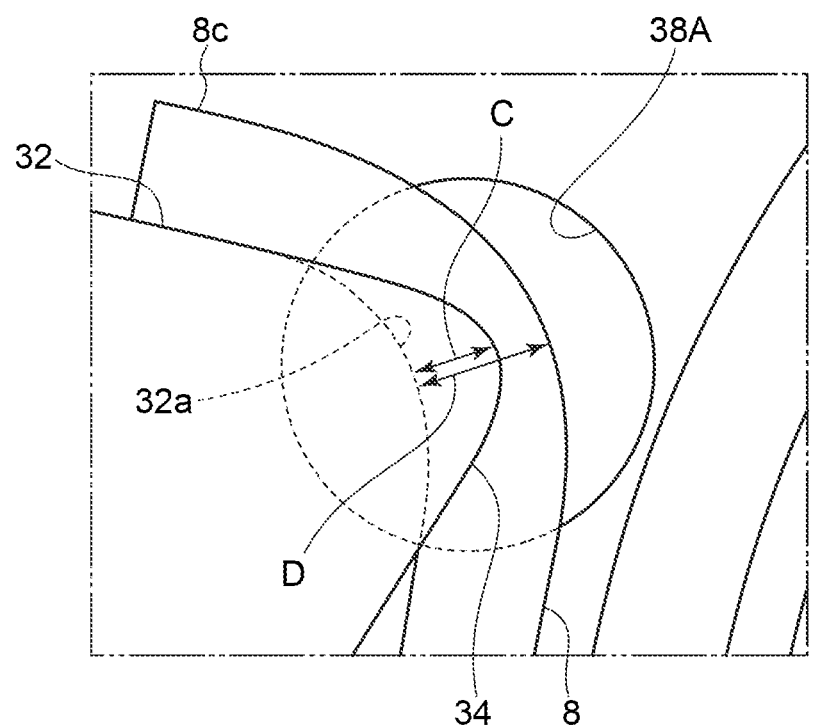
FIG. 6 is a partial enlarged view of the valve timing change device shown in FIG. 3.

FIG. 6 is a partial enlarged view of the valve timing change device 2 shown in FIG. 3.

In the illustrated exemplary embodiment, the retaining portion 34 is formed to satisfy C≥D/2, where C is the width of overlap of the retaining portion 34 and the spring 8 in the thickness direction of the spring 8, and D is the thickness of the spring 8, in the axial view.

Next, effects that can be achieved by the valve timing change device 2 will be described.

In the valve timing change device 2, since the first protruding portion 32 and the retaining portion 34 are formed integrally with the housing 6, compared to the valve timing change device in which the housing and the pin with the retaining portion are separate parts (for example, see Patent Document 1), it is possible to suppress the spring 8 from falling off with a small number of parts, and it is possible to reduce the cost of the valve timing change device 2.

Further, compared to the valve timing change device in which the housing and the pin with the retaining portion are separate parts, the process of assembling the pin provided with the retaining portion to the housing by press-fitting or the like is unnecessary, and the man-hours for assembling the valve timing change device is reduced, so that it is possible to reduce the cost of the valve timing change device 2 in this respect as well.

Further, as shown in FIG. 3, the retaining portion 34 is disposed in the existence range of the fastening hole 38A in the axial view. Therefore, the retaining portion 34 can be easily integrally formed with the first protruding portion 32 and the housing using a simple die structure without requiring undercut processing.

Further, as shown in FIG. 1, the first protruding portion 32 connects the outer peripheral protruding portion 40A extending along the circumferential direction on the outer peripheral side of the spring 8 to the retaining portion 34. Therefore, while the outer peripheral protruding portion 40A suppresses the spring 8 from interfering with surrounding members, the stiffness of the outer peripheral protruding portion 40A effectively suppresses the first protruding portion 32 from being deformed by the biasing force from the spring 8.

Further, as shown in FIG. 1, the outer peripheral protruding portions 40 (40A to 40C) are formed integrally with the first protruding portion 32, the retaining portion 34, and the housing 6. Therefore, with a small number of parts, while the outer peripheral protruding portion 40A prevents the spring 8 from interfering with surrounding members, the stiffness of the outer peripheral protruding portion 40A effectively prevents the first protruding portion 32 from being deformed by the biasing force from the spring 8.

Further, as shown in FIG. 5, since the dimension B of the first protruding portion 32 in the circumferential direction is larger than the maximum value A of the distance between the side surface 32a of the first protruding portion 32 and the outer peripheral surface 6b of the housing 6, it is possible to effectively suppress the deformation of the first protruding portion 32 due to the biasing force from the spring 8 in the circumferential direction, compared to the case where the dimension B is equal to or smaller than the maximum value A (for example, when the cross-sectional shape of the first protruding portion 32 perpendicular to the axial direction is circular).

Further, as shown in FIG. 6, since C≥D/2 is satisfied, where C is the width of overlap of the retaining portion 34 and the spring 8, and D is the thickness of the spring 8 in the axial view, it is possible to effectively suppress the spring 8 from falling out of the retaining portion 34 in the axial direction.

The present invention is not limited to the embodiments described above, but includes modifications to the embodiments described above, and embodiments composed of combinations of those embodiments.

For example, in the above-described embodiment, hydraulic pressure is illustrated as the drive source of the vane rotor 4, but the drive source of the vane rotor 4 is not limited to hydraulic pressure and may be a motor.

Further, in the above-described embodiment, the mainspring is illustrated as the spring 8, but the spring is not limited to the mainspring and may be any other spring, such as a torsion coil spring. If the mainspring is used as the spring 8, it may be a contact mainspring or a non-contact mainspring.

Further, in the above-described embodiment, the vane rotor 4 side is connected to the camshaft 20 while the housing 6 side is connected to the crankshaft, but the vane rotor side may be connected to the crankshaft while the housing 6 side may be connected to the camshaft. In other words, although the above-described embodiment has been described in conjunction with the configuration in which the rotational force of the crankshaft (not shown) transmitted to the sprocket 10 is transmitted from the vane rotor 4 to the camshaft 20 to rotate the camshaft 20, in other embodiments, the rotational force of the crankshaft (not shown) transmitted to the vane rotor may be transmitted to the camshaft via the sprocket or other power transmission member to rotate the camshaft.

REFERENCE SIGNS LIST

2 Valve timing change device
4 Vane rotor
6 Housing
6a End surface
6b Outer peripheral surface
8 Spring
8b One end portion
8c Other end portion
10 Sprocket (Power transmission member)
12A Screw (Fastening member)
32 First protruding portion
32a Side surface
34 Retaining portion
38 Fastening hole
40A Outer peripheral protruding portion

The invention claimed is:

1. A valve timing change device for changing a valve timing of a reciprocating engine, comprising:
   a vane rotor;
   a housing accommodating the vane rotor;
   a spring contacting at one end portion the housing and contacting at another end portion the vane rotor to bias the vane rotor against the housing in a circumferential direction of the vane rotor;
   a first protruding portion protruding from an end surface of the housing in a first direction of an axial direction of the vane rotor and contacting the one end portion of the spring so as to be biased by the spring; and
   a retaining portion disposed on an opposite side of the one end portion of the spring from the end surface of the housing and extending from the first protruding portion so as to restrict movement of the one end portion of the spring in the first direction,
   the first protruding portion and the retaining portion being formed integrally with the housing.

2. The valve timing change device according to claim 1, further comprising:
   a power transmission member disposed on an opposite side of the vane rotor from the spring and configured to transmit power; and
   a fastening member inserted in a fastening hole passing through the housing in the axial direction to fasten the power transmission member to the housing,
   wherein a position of the retaining portion overlaps with a position of the fastening hole when the position of the retaining portion and the position of the fastening hole are viewed from the axial direction.

3. The valve timing change device according to claim 1, wherein the housing includes an outer peripheral protruding portion extending along the circumferential direction on an outer peripheral side of the spring so as to protrude from the end surface in the first direction, and
   wherein the first protruding portion connects the outer peripheral protruding portion to the retaining portion.

4. The valve timing change device according to claim 3, wherein the outer peripheral protruding portion is formed integrally with the first protruding portion, the retaining portion, and the housing.

5. The valve timing change device according to claim 1, wherein B>A is satisfied, where A is a maximum value of a distance between a side surface of the first protruding portion and an outer peripheral surface of the housing, and B is a dimension of the first protruding portion in the circumferential direction.

6. The valve timing change device according to claim 1, wherein C≥D/2 is satisfied, where C is a width of overlap of the retaining portion and the spring in a thickness direction of the spring in a view from the axial direction, and D is a thickness of the spring.

7. A valve timing change device for changing a valve timing of a reciprocating engine, comprising:
   a vane rotor;
   a housing accommodating the vane rotor;
   a spring contacting at one end portion the housing and contacting at another end portion the vane rotor to bias the vane rotor against the housing in a circumferential direction of the vane rotor;
   a first protruding portion protruding from an end surface of the housing in a first direction of an axial direction of the vane rotor and contacting the one end portion of the spring so as to be biased by the spring; and a retaining portion extending from the first protruding portion in a direction crossing the first direction so as to restrict movement of the one end portion of the spring in the first direction, the first protruding portion and the retaining portion being formed integrally with the housing.

8. A valve timing change device for changing a valve timing of a reciprocating engine, comprising:

a vane rotor;

a housing accommodating the vane rotor;

a spring contacting at one end portion the housing and contacting at another end portion the vane rotor to bias the vane rotor against the housing in a circumferential direction of the vane rotor;

a first protruding portion protruding from an end surface of the housing in a first direction of an axial direction of the vane rotor and contacting the one end portion of the spring so as to be biased by the spring; and a retaining portion disposed such that a position of the retaining portion overlaps with a position of the one end portion of the spring when the position of the retaining portion and the position of the one end portion of the spring are viewed from the axial direction, the first protruding portion and the retaining portion being formed integrally with the housing.

* * * * *